(12) United States Patent
Li et al.

(10) Patent No.: US 10,389,228 B1
(45) Date of Patent: Aug. 20, 2019

(54) POWER SUPPLY CIRCUIT WITH SURGE-SUPRESSION

(71) Applicant: HONGFUJIN PRECISION ELECTRONICS (TIANJIN) CO., LTD., Tianjin (CN)

(72) Inventors: Ying Li, Tianjin (CN); Xue-Qin Xia, Tianjin (CN)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 15/992,302

(22) Filed: May 30, 2018

(30) Foreign Application Priority Data

Mar. 8, 2018 (CN) .......................... 2018 1 0189048

(51) Int. Cl.
*H02M 3/158* (2006.01)
*H02M 1/32* (2007.01)
*H02M 1/088* (2006.01)

(52) U.S. Cl.
CPC ............. *H02M 1/32* (2013.01); *H02M 1/088* (2013.01); *H02M 3/158* (2013.01)

(58) Field of Classification Search
CPC ........ H02M 3/156; H02M 3/158; H02M 1/32; H02M 1/34; H02M 1/36; H02M 1/088; H02M 2001/342; H02M 2001/344; H02M 2001/346; H02M 2001/348; H02M 7/062; H02M 7/125; H02M 7/5375; H02H 9/001; H02H 9/02; H02H 9/025; H02H 9/026; H02H 1/043; B60L 2270/20; Y02T 10/7044

See application file for complete search history.

(56) References Cited

U.S. PATENT DOCUMENTS

| | | | | |
|---|---|---|---|---|
| 5,973,944 A | * | 10/1999 | Nork ....................... | H02M 1/44 307/110 |
| 8,957,665 B2 | * | 2/2015 | Hayakawa ........ | G01R 19/16542 324/522 |
| 10,027,223 B1 | * | 7/2018 | Zhang ..................... | H02M 3/07 |
| 2012/0286722 A1 | * | 11/2012 | Kabasawa ............. | H02J 7/0018 320/107 |
| 2013/0272742 A1 | * | 10/2013 | Matsumoto ........... | H02M 3/156 399/88 |
| 2016/0172872 A1 | * | 6/2016 | Chang ..................... | H02J 7/007 320/167 |
| 2016/0241057 A1 | * | 8/2016 | Yang ...................... | H02J 7/0024 |
| 2016/0362004 A1 | * | 12/2016 | Einhorn ................. | B60L 3/0069 |

(Continued)

*Primary Examiner* — Gary L Laxton
*Assistant Examiner* — Ivan Laboy
(74) *Attorney, Agent, or Firm* — ScienBiziP, P.C.

(57) ABSTRACT

A power supply circuit which can suppress current surges comprises a first switch unit, a first control unit, a second switch unit, and a second control unit. The first switch unit is coupled between a voltage input terminal and a load, the load comprising a capacitor. The second switch unit is coupled between the voltage input terminal and the load. The second control unit turns on the second switch unit to charge the capacitor to a predetermined voltage before the first control unit controls the first switch unit to turn on. The second control unit controls the second switch unit to turn off when a voltage of the capacitor is greater than the predetermined voltage, and the first control unit controls the first switch unit to then turn on to supply power to the load.

8 Claims, 4 Drawing Sheets

(56) References Cited

U.S. PATENT DOCUMENTS

2017/0229872 A1* 8/2017 Ghotra .................... H02J 3/005
2018/0029490 A1* 2/2018 Fritz ................... B60L 11/1853
2018/0083438 A1* 3/2018 Reed .................. H05B 33/0887

* cited by examiner

POWER SUPPLY CIRCUIT WITH SURGE-SUPRESSION

FIELD

The subject matter herein generally relates to power supply circuits.

BACKGROUND

A power supply circuit may supply power to one or more capacitive load units of an electronic device. When a power switch of the power supply circuit is turned on, a surge current may be generated, and the surge current may be harmful to hardware or software of the electronic device.

BRIEF DESCRIPTION OF THE DRAWINGS

Implementations of the present technology will now be described, by way of example only, with reference to the attached figures.

DETAILED DESCRIPTION

Figure 1:
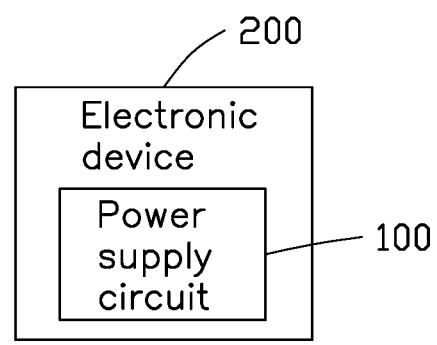
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a power supply circuit 100 in accordance with an embodiment.

The power supply circuit 100 may be operated in an electronic device 200. The electronic device 200 may be a server, a computer, or a household appliance.

Figure 2:
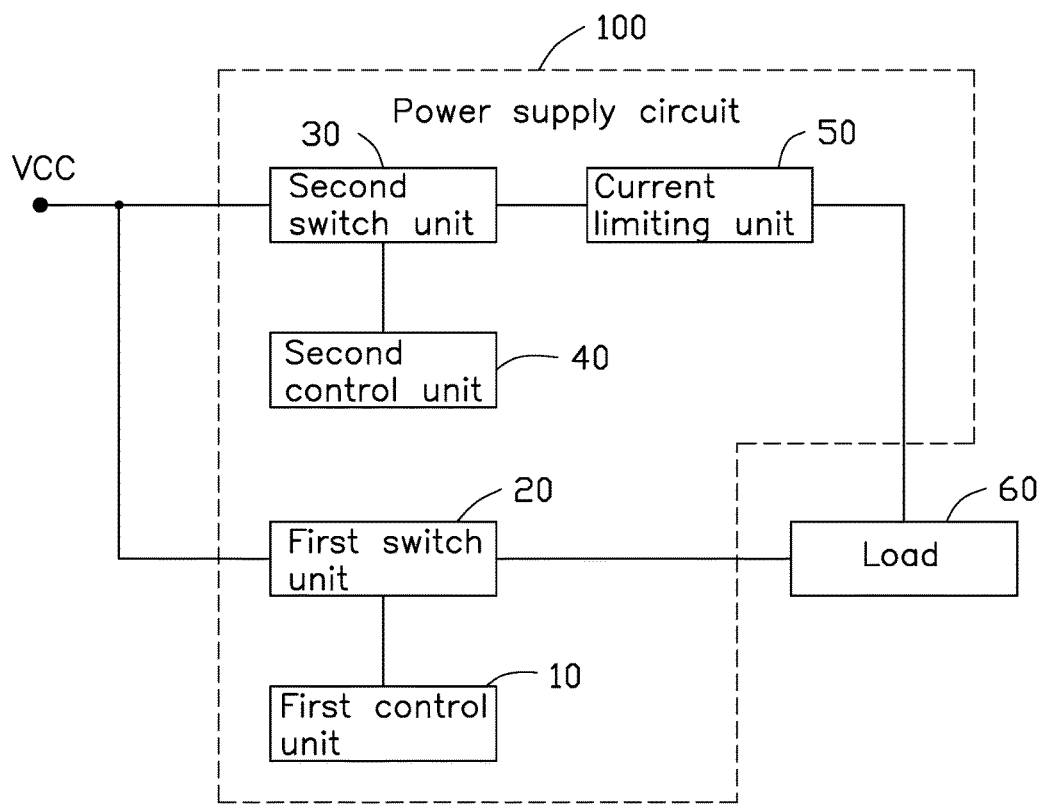
FIG. 2 is a block diagram of an embodiment of a power supply circuit.

Referring to FIG. 2, the power supply circuit 100 comprises a first control unit 10, a first switch unit 20, a second switch unit 30, a second control unit 40, and a current limiting unit 50. The first switch unit 20 is coupled between a voltage input terminal Vcc and a load 60. The first control unit 10 is coupled to the first switch unit 20, and configured to turn the first switch unit 20 on or off. When the first control unit 10 controls the first switch unit 20 to turn on, the voltage input terminal Vcc may supply power to the load 60 through the first switch unit 20.

In one embodiment, the load 60 may be capacitive load, and the capacitive load may be a module or a electronic element of the electronic device 200.

Figure 3:
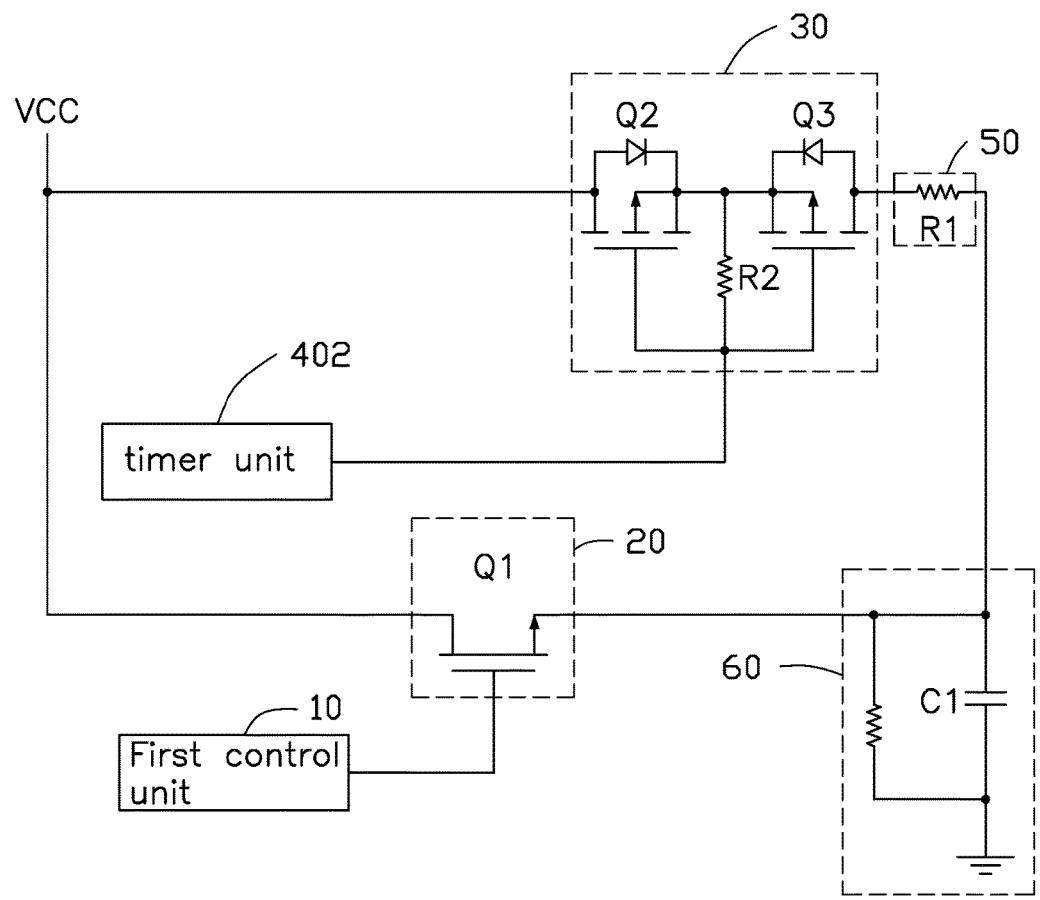
FIG. 3 is a circuit diagram of an embodiment of the power supply circuit of FIG. 2.

In one embodiment, the load 60 comprises a capacitor C1 (as shown in FIG. 3). The second switch unit 30 is coupled between the voltage input terminal Vcc and the load 60. The second control unit 40 is coupled to the second switch unit 30. The second control unit 40 controls the second switch unit 30 to turn on, to charge the capacitor C1 to a predetermined voltage, before the first control unit 10 turns the first switch unit 20 on. For example, the first control unit 10 controls the first switch unit 20 to turn on at a first time t1, the second control unit 40 controls the second switch unit 30 to turn on at a second time t2. The second time t2 is earlier than the first time t1 for a predetermined period. For example, the first time t1 is equal to the second time t2 plus 50 millisecond, the second control unit 40 controls the second switch unit 30 to charge the capacitor C1 during the 50 millisecond.

The current limiting unit 50 is coupled to the second switch unit 30 in series. The current limiting unit 50 is configured to limit a charge current of the capacitor C1 in response to the voltage input terminal Vcc charging the capacitor C1 through the second switch unit 30.

When a voltage of the capacitor C1 is greater than the predetermined voltage, the second control unit 40 controls the second switch unit 30 to turn off. The first control unit 10 then controls the first switch unit 20 to turn on to supply power to the load 60. For example, a voltage of the voltage input terminal Vcc is 12V and the predetermined voltage is 6V. Firstly, the second control unit 40 controls the second switch unit 30 to turn on to charge the capacitor C1 to 6V. Secondly, the second control unit 40 controls the second switch unit 30 to turn off and the first control unit 10 controls the first switch unit 20 to turn on after a voltage of the capacitor C1 is 6V. The capacitor C1 is thus pre-charged before the first switch unit 20 is turned on, thereby the power supply circuit 100 can suppress current surges.

Referring to FIG. 3, the first switch unit 20 comprises a first transistor Q1. A control terminal of the first transistor Q1 is coupled to the first control unit 10, a first terminal of the first transistor Q1 is coupled to the voltage input terminal Vcc, and a second terminal of the first transistor Q1 is coupled to a first terminal of the capacitor C1. A second terminal of the capacitor C1 is grounded. The first control unit 10 can be a control chip or a microcontroller.

In one embodiment, when the first control unit 10 outputs a high level signal to the control terminal of the first transistor Q1, the first transistor Q1 is turned on, and the voltage input terminal Vcc can supply power to the load 60. When the first control unit 10 outputs a low level signal to the control terminal of the first transistor Q1, the first transistor Q1 is turned off. The first transistor Q1 can be an NPN transistor or a metal oxide semiconductor field effect transistor (MOSFET) for example.

The current limiting unit 50 comprises a first resistor R1. The second switch unit 30 comprises a second transistor Q2, a second resistor R2, and a third transistor Q3. A control terminal of the second transistor Q2 is coupled to the second control unit 40, a first terminal of the second transistor Q2 is coupled to the voltage input terminal Vcc, and a second terminal of the second transistor Q2 is coupled to a first terminal of the second resistor R2. A second terminal of the second resistor R2 is coupled to the control terminal of the second transistor Q2. A control terminal of the third transistor Q3 is coupled to the control terminal of the second transistor Q2, a first terminal of the third transistor Q3 is coupled to a first terminal of the first resistor R1, and a second terminal of the third transistor Q3 is coupled to the second terminal of the second transistor Q2. A second terminal of the first resistor R1 is coupled to the first terminal of the capacitor C1.

In one embodiment, the second control unit 40 comprises a timer unit 402, and the timer unit 402 is configured to control the second transistor Q2 and the third transistor Q3 to turn on during a period of time before the first control unit 10 controls the first switch unit 20 to turn on. Thus, the capacitor C1 can be pre-charged before the first control unit 10 controls the first switch unit 20 to turn on.

In one embodiment, the first control unit 10 and the second control unit 40 can be integrated in a control chip. The control chip can comprise two general purpose input/output (GPIO) pins to control the first transistor Q1, the second transistor Q2, and the third transistor Q3 to turn on and off.

Figure 4:
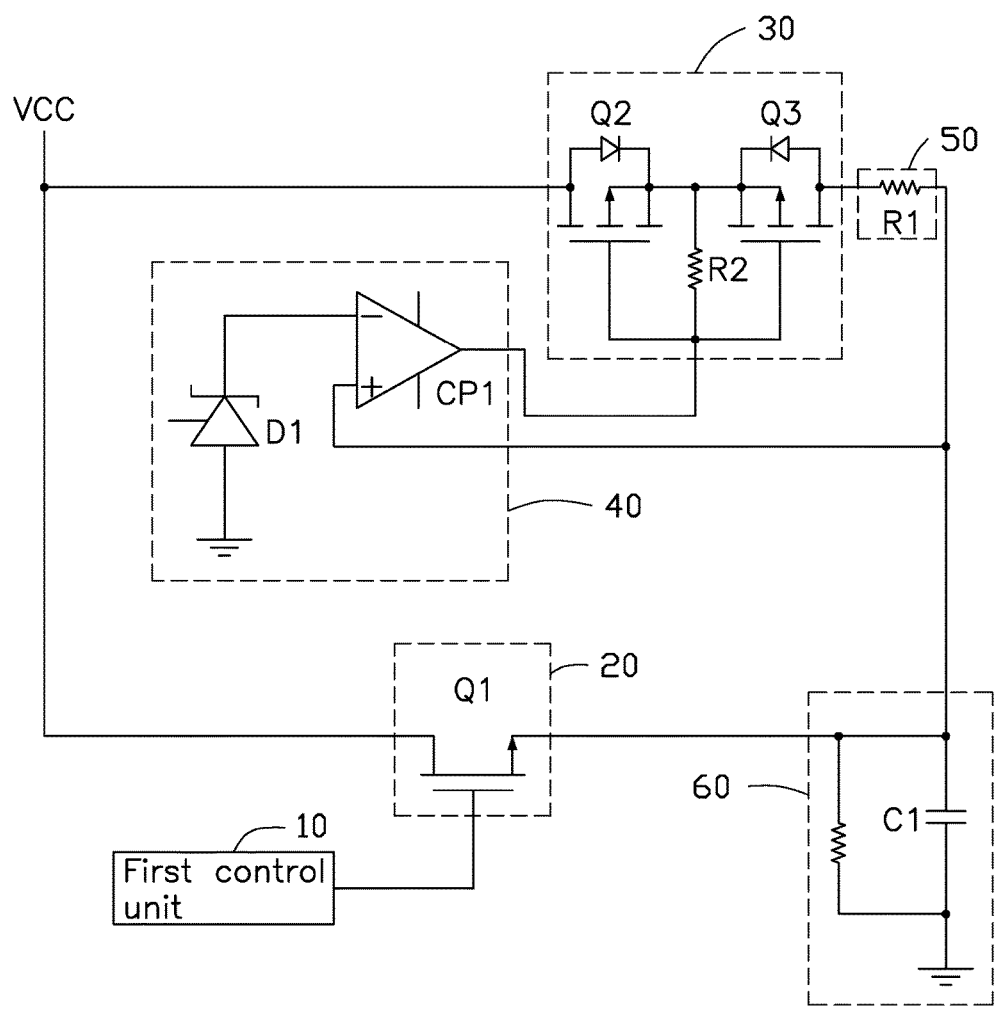
FIG. 4 is a circuit diagram of another embodiment of the power supply circuit of FIG. 2.

Referring to FIG. 4, the second control unit 40 can comprise a comparator CP1 and an adjustable stabilivolt device (stabilivolt D1). A positive input terminal of the comparator CP1 is coupled to the first terminal of the capacitor C1, a negative input terminal of the comparator CP1 is coupled to a cathode of the adjustable stabilivolt D1, and an output terminal of the comparator CP1 is coupled to the control terminal of the second transistor Q2 and the control terminal of the third transistor Q3. An anode of the adjustable stabilivolt D1 is grounded.

In one embodiment, adjustable stabilivolt D1 may be a three terminal voltage stabilizing IC device. A stabilized voltage of the adjustable stabilivolt D1 can be equal to the predetermined voltage.

In one embodiment, the second transistor Q2 and the third transistor Q3 can be P-channel field effect transistors. The control terminal of the second transistor Q2 and the control terminal of the third transistor Q3 are gate electrodes of the P-channel field effect transistors. The first terminal of the second transistor Q2 and the first terminal of the third transistor Q3 are drain electrodes of the P-channel field effect transistors, and the second terminal of the second transistor Q2 and the second terminal of the third transistor Q3 are source electrodes of the P-channel field effect transistors.

The embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supply circuit comprising:
    a first switch unit coupled between a voltage input terminal and a load, and the load comprising a capacitor;
    a first control unit coupled to the first switch unit and configured to control the first switch unit to turn on or off;
    a second switch unit coupled between the voltage input terminal and the load;
    a second control unit coupled to the second switch unit, and configured to control the second switch unit to turn on to charge the capacitor to a predetermined voltage before the first control unit controls the first switch unit to turn on; and
    a current limiting unit coupled to the second switch unit in series and configured to limit a charge current of the capacitor;
    wherein when a voltage of the capacitor is greater than the predetermined voltage, the second control unit controls the second switch unit to turn off and the first control unit controls the first switch unit to turn on to supply power to the load;
    wherein the second control unit comprises:
    a comparator, a positive input terminal of the comparator coupled to the capacitor; and
    an adjustable stabilivolt, an anode of the adjustable stabilivolt grounded, and a cathode of the adjustable stabilivolt coupled to a negative input terminal of the comparator; and
    wherein the second switch unit comprises:
    a first transistor, a control terminal of the first transistor coupled to an output terminal of the comparator, and a first terminal of the first transistor coupled to the voltage input terminal;
    a first resistor coupled between the control terminal of the first transistor and a second terminal of the first transistor; and
    a second transistor, a control terminal of the second transistor coupled to the control terminal of the first transistor, a first terminal of the second transistor coupled to the capacitor, and a second terminal of the second transistor coupled to the second terminal of the first transistor.

2. The power supply circuit of claim 1, wherein the first control unit is configured to control the first switch unit to turn on at a first time, the second control unit is configured to control the second switch unit to turn on at a second time, and the second time is earlier than the first time for a predetermined period.

3. The power supply circuit of claim 1, wherein the first transistor and the second transistor are P-channel field effect transistors, the control terminal of the first transistor and the control terminal of the second transistor are gate electrodes of the P-channel field effect transistors, the first terminal of the first transistor and the first terminal of the second transistor are drain electrodes of the P-channel field effect transistors, and the second terminal of the first transistor and the second terminal of the second transistor are source electrodes of the P-channel field effect transistors.

4. The power supply circuit of claim 1, wherein the current limiting unit comprises a second resistor, a first terminal of the second resistor is coupled to the first terminal of the second transistor, and a second terminal of the second resistor is coupled to the capacitor.

5. A power supply circuit comprising:
    a first switch unit coupled between a voltage input terminal and a load, and the load comprising a capacitor;

a first control unit coupled to the first switch unit and configured to control the first switch unit to turn on or off;

a second switch unit coupled between the voltage input terminal and the load; and a second control unit coupled to the second switch unit, and configured to control the second switch unit to turn on to charge the capacitor to a predetermined voltage before the first control unit controls the first switch unit to turn on; and wherein when a voltage of the capacitor is greater than the predetermined voltage, the second control unit controls the second switch unit to turn off and the first control unit controls the first switch unit to turn on to supply power to the load;

wherein the second control unit comprises:

a comparator, a positive input terminal of the comparator coupled to the capacitor; and an adjustable stabilivolt, an anode of the adjustable stabilivolt grounded, and a cathode of the adjustable stabilivolt coupled to a negative input terminal of the comparator; and wherein the second switch unit comprises:

a first transistor, a control terminal of the first transistor coupled to an output terminal of the comparator, and a first terminal of the first transistor coupled to the voltage input terminal;

a first resistor coupled between the control terminal of the first transistor and a second terminal of the first transistor; and a second transistor, a control terminal of the second transistor coupled to the control terminal of the first transistor, a first terminal of the second transistor coupled to the capacitor, and a second terminal of the second transistor coupled to the second terminal of the first transistor.

6. The power supply circuit of claim 5, wherein the first control unit is configured to control the first switch unit to turn on at a first time, the second control unit is configured to control the second switch unit to turn on at a second time, and the second time is earlier than the first time for a predetermined period.

7. The power supply circuit of claim 5, wherein the first transistor and the second transistor are P-channel field effect transistors, the control terminal of the first transistor and the control terminal of the second transistor are gate electrodes of the P-channel field effect transistors, the first terminal of the first transistor and the first terminal of the second transistor are drain electrodes of the P-channel field effect transistors, and the second terminal of the first transistor and the second terminal of the second transistor are source electrodes of the P-channel field effect transistors.

8. The power supply circuit of claim 5, wherein the second switch unit further comprises a second resistor, a first terminal of the second resistor is coupled to the first terminal of the second transistor, and a second terminal of the second resistor is coupled to the capacitor.

* * * * *